Sept. 7, 1948.  J. LA RAUS  2,448,988
HEATING SYSTEM
Filed Dec. 13, 1945

INVENTOR
Julius La Raus
BY John P. Chandler
his ATTORNEY

Patented Sept. 7, 1948

2,448,988

UNITED STATES PATENT OFFICE 2,448,988

HEATING SYSTEM

Julius La Raus, Westport, Conn.

Application December 13, 1945, Serial No. 634,840

3 Claims. (Cl. 237—2)

1

This invention relates to heating systems and apparatus therefor, and relates more particularly to a novel heating system for space heating and for the heating of domestic hot water.

An important object of the invention is to provide means, in conjunction with a winter air-conditioning furnace, for heating domestic hot water, both in the wintertime as well as in the summer.

Another object of the invention is the provision of a heating system wherein domestic hot water may be effectually heated in the summer without permitting any of the heat to pass into the rooms.

Yet another object of the present invention is to provide a dual heating system for space heating and for the heating of domestic hot water, wherein no change in the apparatus is necessary from winter operation, when both rooms and the domestic water are heated, to summer operation, when only the latter is heated. If desired, slight readjustments between summer and winter operation may be made, but these can be quickly and easily effected and they do not alter the principal operating characteristics of the system.

Hot air heating systems have, in general, been effective only for a single purpose, i. e., space heating. Efforts to place coils for domestic hot water in the fire box, the smoke flue or the bonnet, have failed for one or more of a number of reasons, most of which were related, directly or indirectly, to the problem of control. Thus, a water coil placed in the radiant heat zone became overheated in cold weather when the rooms called for heat over considerable periods of time. In some cases, if the system supplied sufficient domestic hot water in the winter, the space heating efficiency was greatly impaired. Other arrangements gave too little hot water in the summer and too much in the winter. Also, cut-off means for space heating in the summer were only partially satisfactory.

An important feature of the system of the present invention resides in the fact that the heat transfer coils for the domestic hot water supply are disposed within a separate by-pass duct disposed outside but adjacent to the furnace housing, the opposite ends of the duct being connected adjacent to the return air duct from the house and the air supply duct to the house, respectively.

The amount of heated air passing through this by-pass duct and available for domestic water heating, is automatically regulated by a damper which is controllable by the same prime mover

2 as controls operation of the dampers which cut out hot air supply to the house during summer operation. Means are provided in the system for so controlling both ducts as to always favor the air supply for house heating during winter operation, in order that there is no diminution in house heating efficiency, though providing an adequate supply of domestic hot water at all times.

The apparatus of the present invention is inexpensive to construct, is simple in operation and can either be built into any standard hot air furnace or can be readily installed in a furnace already in operation.

Figure 1:
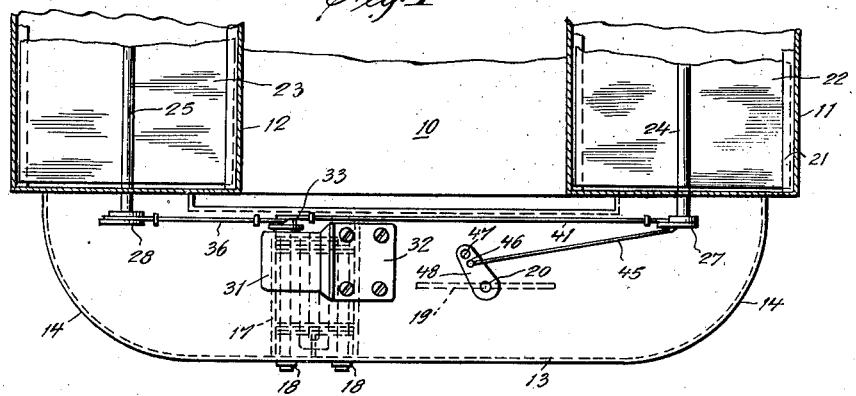
Fig. 1 is a top plan view of the supplemental domestic hot water heating apparatus of the present invention illustrated in connection with a conventional hot air furnace having ducts and a blower.
Figure 2:
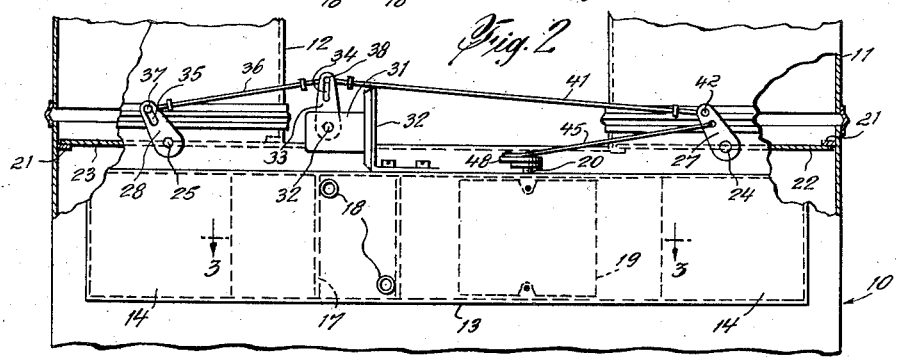
Fig. 2 is a side elevation thereof.

In the drawing, 10 designates a conventional hot air furnace having a return duct 11 from the house and a heated air supply duct 12.

By-pass duct 13 may be generally square in transverse section and is provided with curved terminal portions 14, one of which is connected with the furnace housing adjacent to return duct 11 and the opposite one of which is connected adjacent to supply duct 12.

Domestic water heating coils 17 are disposed within duct 13 at any suitable point and are provided with terminals 18 for connection with the domestic water system. The particular form or contour of coils 17 is a matter of choice, it only being desirable to so arrange the coils as to obtain a maximum transfer of heat from the heated air. A regulating damper 19 carried on shaft 20 is pivotally mounted within the duct and is of such proportions as to substantially completely block off the duct when fully closed, although under normal operation this regulating damper is never fully closed, as will be pointed out more in detail hereinafter.

Air return and air supply ducts 11 and 12 are provided adjacent their inner terminals with dampers 22 and 23, respectively, such dampers being carried on shafts 24 and 25 having crank members 27 and 28 at one end thereof. Dampers 22 and 23 may have the usual damper stops 21 on two or four sides of the ducts so as to completely seal the ducts when such dampers are fully closed. In normal operation of the system such dampers are either fully opened or fully closed.

Dampers 22 and 23 as well as regulating damper 17 are actuated by a reversible damper motor 31 of usual construction, such motor being provided with a suitable mounting such as a bracket 32 secured on the upper surface of duct 13. Shaft 32 of motor 31 carries a crank member 33 having a slot 34 and crank member 28 may have a similar slot 35. A link 36 has a pin 37 at one end thereof positioned in slot 35 and at its opposite end has a pin 38 positioned in slot 34 in crank member 33 on motor shaft 32. Another, and somewhat longer link 41 is connected at one end thereof with pin 38 and at its opposite end is provided with a pin 42 pivotally mounted within an aperture adjacent the outer terminal of crank member 27. The provision of slot 35 in crank member 28 assures a more positive closure of the damper's air supply duct 12 whereas there is less need for such a tight closure of the damper in return duct 11.

A link 45 carries at one end thereof a pin 46 which passes through one of a plurality of openings 47 in a crank member 48 carried on regulating damper shaft 29. At its other end link 45 is connected with crank member 27.

Figure 4:
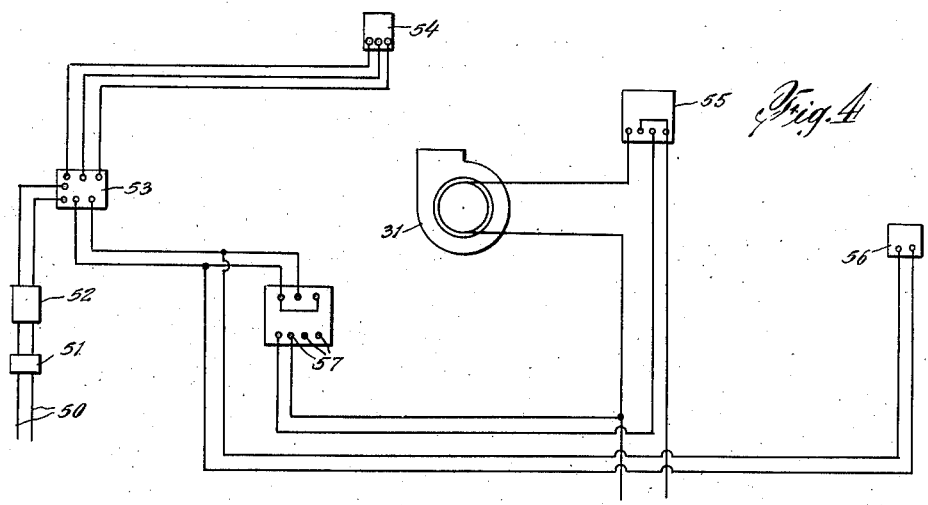
Fig. 4 illustrates a circuit arrangement.
Figure 3:
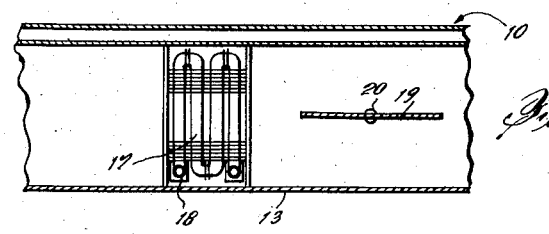
Fig. 3 is a section taken on line 3—3 of Fig. 2.

An operative circuit arrangement is shown in Fig. 4. Power lines 50 pass through fuse box 51 and transformer 52 to damper control 53. 54 is the usual thermostat for regulating room temperature. A combination furnace control is indicated at 55, and 56 designates an Aquastat positioned in the domestic hot water supply tank (not shown). Terminals 57 may be connected with the burner.

The circuit is so arranged as to cause both the thermostat and the Aquastat to operate the damper motor 31. During the periods when the thermostat is not calling for heat the main dampers 22 and 23 are closed. When the thermostat calls for heat the motor opens the main dampers and maintains them in open position until the thermostat is satisfied and at such time reverse action of the motor closes the main dampers.

The operation of the system may be substantially as follows: Following a period of inactivity, the room thermostat 54 will call for heat and this will cause the main dampers 22 and 23 to open fully while partially closing the by-pass chamber. The burner then commences operation and when the air temperature in the bonnet rises to a predetermined point, generally around 175° F., the furnacestat (not shown), controlling the operation of the blower makes contact and starts operation of the blower motor and accordingly delivers heat to the house. Inasmuch as the by-pass damper is not fully closed, a small amount of the hot air passes through the by-pass duct 13 and accordingly heats coils 17. The volume of air passing through the by-pass duct under such condition is sufficiently small as not to deprive the house of any considerable quantity of heat.

After the room thermostat is satisfied the main damper closes fully and the by-pass damper opens fully. The burner then stops and the blower motor continues to operate until the air temperature in the bonnet reaches a predetermined low point of approximately 150° F., at which point the furnacestat controlling the blower motor stops operation of such motor. In the event that the air temperature builds up in the bonnet due to residual heat in the furnace, the blower will again commence operation and cause the heated air to pass over the hot water coils but not to the house since the main dampers are closed.

The Aquastat 56 which is desirably located in the hot water storage tank is influenced by the temperature of such water. When the Aquastat calls for heat the circuit arrangement is such as to cause the burner to commence operation while the main dampers remain in a closed position. At this time also, the by-pass chamber is still wide open. As soon as the temperature in the bonnet reaches the same predetermined high point (i. e., 175° F.) the furnacestat controlling the blower motor makes contact and the blower forces the hot air through the by-pass duct over the water heating coils. As soon as the Aquastat is satisfied the burner cuts off and the blower motor continues to operate until the temperature of the air in the bonnet is cooled to the predetermined point (i. e., 150° F.) where the furnacestat stops operation of the motors.

In hot air heating systems the furnace is usually provided with an upper limit control so that if the air temperature in the bonnet should rise too high such limit control automatically stops operation of the burner but permits the blower to operate until the air temperature has been reduced to a safe temperature.

In the event that both the thermostat and Aquastat call for heat at the same instant, the thermostat nevertheless operates the damper motor to open the main dampers and the house will thereupon become heated until the thermostat is satisfied. At this point, the main dampers again close and the Aquastat takes over control of the system until the water temperature in the storage tank has been raised to a desired point.

It will be appreciated from the foregoing that during summer operation the main dampers will remain fully closed at all times since the room temperature would, in all events, not drop sufficiently to influence the thermostat to start operation of the burner and open the main dampers. This arrangement prevents any heat from rising to the house. In other words, the burner and the blower operate only when the Aquastat calls for hot water.

While one form or embodiment of the invention has been shown and described herein for illustrative purposes, and the construction and arrangement incidental to a specific application thereof have been disclosed and discussed in detail, it is to be understood that the invention is limited neither to the mere details or relative arrangement of parts, nor to its specific embodiment shown herein, but that extensive deviations from the illustrated form or embodiment of the invention may be made without departing from the principles thereof.

What I claim is:

1. In a hot air system for the heating of space and domestic hot water and including a furnace provided with a burner, air supply and air return chambers and ducts leading from such chambers for the space heating, the combination of dampers in each of said ducts arranged to close the same, and a by-pass duct connecting such chambers, a conduit for the heating of the domestic hot water within the by-pass duct, a damper arranged to close the by-pass duct, a damper motor arranged to completely close the air supply and return ducts and open the by-pass duct when in one position, and to open the former ducts and substantially close the latter duct when in another position, a thermostat responsive to the temperature in the space to be heated and an Aquastat responsive to the temperature of the domestic hot water, the thermostat being arranged to start burner operation and open the air supply and return duct dampers while substantially closing the by-pass damper when the space calls for heat, the Aquastat being arranged to close the former dampers and open the latter when the space heating requirements have been satisfied and the domestic water calls for heat.

2. A hot air system for the heating of space and domestic hot water comprising a furnace provided with a burner having air supply and air return chambers, ducts leading from such chambers for the space heating, dampers in each of said ducts arranged to close the same, and a by-pass duct disposed exteriorly of the furnace connecting such chambers, coils for the heating of the domestic hot water within the by-pass duct, a damper arranged to substantially close the by-pass duct, a damper motor arranged to completely close the air supply and return ducts and open the by-pass duct when in one position, and to open the former ducts and substantially close the latter duct when in another position, a thermostat responsive to the temperature in the space to be heated and an Aquastat responsive to the temperature of the domestic hot water, and a circuit controlling operation of the burner and the damper motor and including the thermostat and the Aquastat, the thermostat being arranged to start burner operation and open the air supply and return duct dampers while closing the by-pass damper, the Aquastat being arranged to close the former dampers and open the latter when the space heating requirements have been satisfied.

3. A hot air system for the heating of space and domestic hot water, comprising a furnace provided with a burner, and air supply and air return chambers, ducts leading from such chambers for the space heating, dampers in each of said ducts arranged to close the same, and a by-pass duct connecting such chambers, coils for the heating of the domestic hot water within the by-pass duct, a damper arranged to close the by-pass duct, damper closing means arranged to completely close the air supply and return ducts and open the by-pass duct when in one position, and to open the former ducts and substantially close the latter duct when in another position, a thermostat responsive to the temperature in the space to be heated and an Aquastat responsive to the temperature of the domestic hot water, and a circuit controlling operation of the burner and the damper closing means and including the thermostat and the Aquastat, the thermostat being arranged to start burner operation and open the air supply and return duct dampers while closing the by-pass damper, the Aquastat being arranged to close the former dampers and open the latter when the space heating requirements have been satisfied and the domestic water calls for heat.

JULIUS LA RAUS.

REFERENCES CITED

The following references are of record in the file of this patent:

UNITED STATES PATENTS

| Number | Name | Date |
| --- | --- | --- |
| 1,144,032 | Geissinger | June 22, 1915 |
| 2,266,217 | Kingsland | Dec. 16, 1941 |
| 2,314,086 | Giffords | Mar. 16, 1943 |
| 2,331,907 | Harrington | Oct. 19, 1943 |